United States Patent [19]

Nakao et al.

[11] Patent Number: 4,653,745
[45] Date of Patent: Mar. 31, 1987

[54] HANDLE FOR AN ERGOMETER OR THE LIKE

[75] Inventors: Shinroku Nakao, Kanagawa; Yoshiyasu Ishii, Tokyo; Kenshun Ishii, Tokyo; Kunimasa Tsuchiya, Tokyo, all of Japan

[73] Assignee: Combi Co., Ltd., Tokyo, Japan

[21] Appl. No.: 763,781

[22] Filed: Aug. 8, 1985

[30] Foreign Application Priority Data

Aug. 9, 1984 [JP] Japan ............................ 59-122371[U]

[51] Int. Cl.$^4$ ........................ A63B 21/00; B62K 21/14
[52] U.S. Cl. ..................................... 272/73; 74/551.1; 403/87; 403/362
[58] Field of Search ............................ 272/73, 67–68, 272/143; 74/551.1, 551.2, 551.3, 551; 403/84, 87, 362, 383; 280/279, 779; 273/79

[56] References Cited

U.S. PATENT DOCUMENTS

| | | | |
|---|---|---|---|
| 1,165,559 | 12/1915 | Vories | 273/79 |
| 2,178,935 | 11/1939 | Henry | 74/551.1 |
| 2,274,747 | 5/1940 | Schwinn . | |
| 3,565,380 | 2/1971 | Langren | 403/362 |
| 4,291,872 | 9/1981 | Brilando et al. . | |
| 4,323,263 | 4/1982 | Cook | 74/551.1 |

Primary Examiner—Richard J. Apley
Assistant Examiner—S. R. Crow
Attorney, Agent, or Firm—Finnegan, Henderson, Farabow, Garrett & Dunner

[57] ABSTRACT

A handle mounted on the top of the handle post of an ergometer is made up of a parallel rod and handle grips extended from both ends of the parallel rod, each of the handle grips is L-shaped, consisting of a gripping rod and an upright rod, the handle grips being perpendicular to the longitudinal direction of the parallel rod. Further, the handle mounted on the top of the ergometer can be turned by comprising, the parallel rod having a middle portion which is polygonal in section, a holder secured to the upper end of the handle post, a parallel rod holding means for receiving the middle portion being slidable mounted inside the holder, a knob means for sliding the parallel rod holding means by threadable engaging with the parallel rod holding means through the holder, a spring means for pulling the knob means towards the user at all times being elastically mounted on the holder, and the holder being a frame having parallel side walls in the central portions of which parallel inserting grooves are cut so that the middle portion can be inserted from front and secured therein.

4 Claims, 6 Drawing Figures

HANDLE FOR AN ERGOMETER OR THE LIKE

BACKGROUND OF THE INVENTION

The present invention relates a handle for an ergometer or the like.

A variety of ergometers for increasing physical strength or exercising persons are well known in which the wheel of a bicycle-like device on the floor is combined with a brake system or a loading mechanism so that a load applied to the rotation of the wheel is adjusted according to the physical strength of the user. In a conventional ergometer of this type, attention is paid to the adjustment of a load applied to the wheel rotation mechanism, but improvement of the handle which is the contact between the user's body and the ergometer is disregarded.

When the user takes a pedalling exercise by putting forth a strength greater than his physical strength as in an interval training using an ergometer, but he does it while strongly pulling the handle grips towards his breast. In this connection, it has been found through experiments that, if the handle grips are held in parallel with the shoulders of the user, he can put forth his strength more and his wrists are less fatigued. It is considered that these effects are due to the physique and the muscular structure of the wrists. It has been found that, in order to maximize the effects, it is essential in a sense of human engineering also to adjust the distance between the saddle and the handle grips and to change the position of the handle grips according to the physical constitution of the person.

The present inventors have intended to solve these problems according to the above-described experimental results, and achieve the object by accomplishing the present invention as described below.

SUMMARY OF THE INVENTION

An object of the present invention is to provide a handle for an ergometer or the like which is mounted on a handle post and the mounting angle of which can be changed to adjust the distance between the user and the handle grips.

Another object of the present invention is to provide a handle for an ergometer or the like which is mounted on a handle post and which is fixedly secured with simple means.

DETAILED DESCRIPTION OF THE PREFERRED EMBODIMENT

One embodiment of the present invention will be described with reference to the accompanying drawings.

Figure 1:
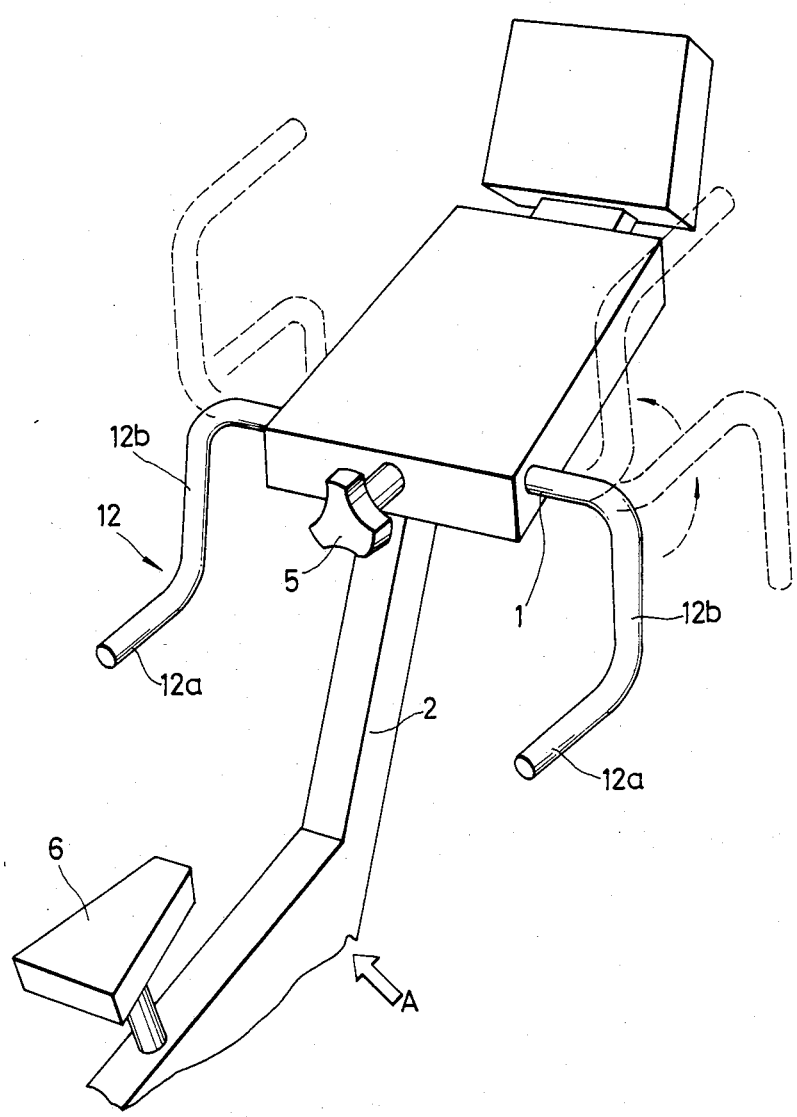
FIG. 1 is a perspective view showing a handle according to one embodiment of the present invention.
Figure 2:
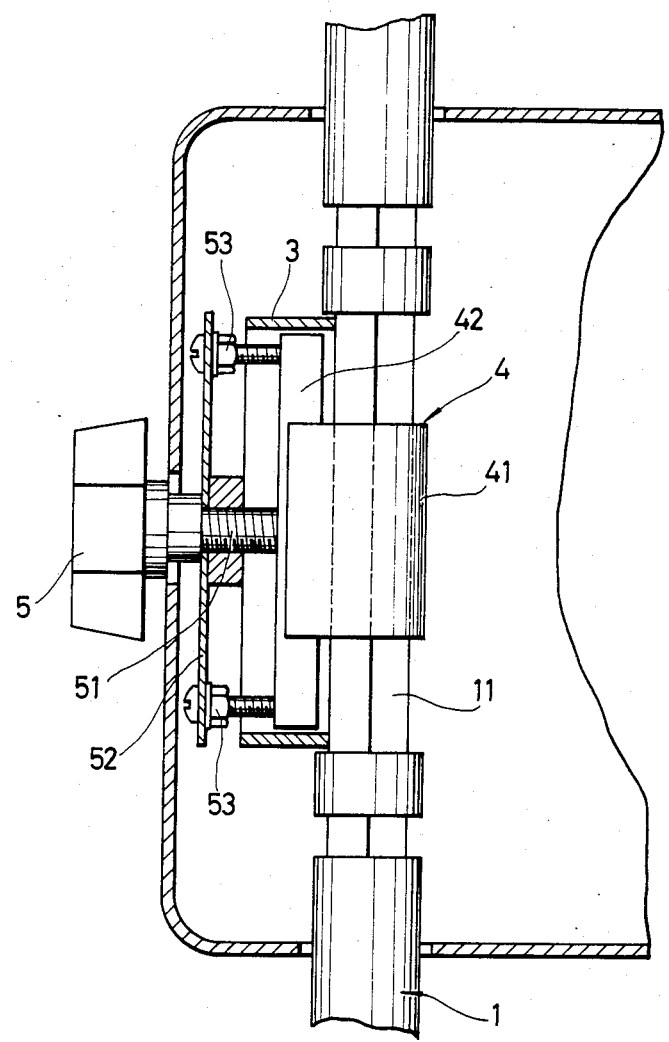
FIG. 2 is a plan view, with parts cut away, showing the handle secured to a holder according to the embodiment.
Figure 3:
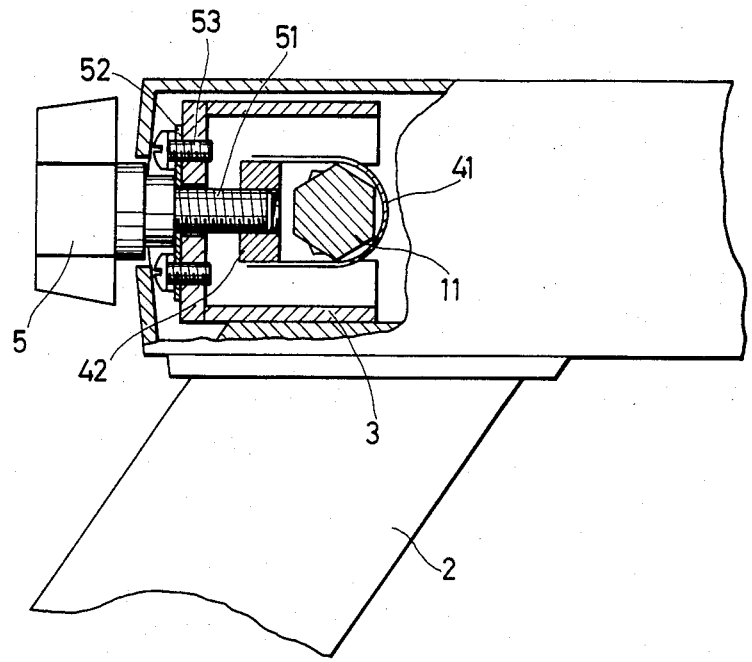
FIG. 3 is a sectional view showing the handle and the holder according to the embodiment.
Figure 4:
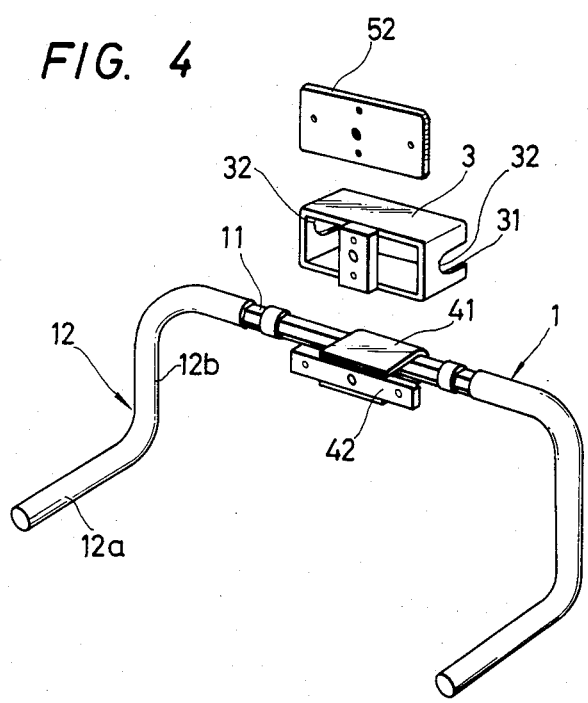
FIG. 4 is an exploded perspective view of the handle and the holder according to the embodiment.

In the drawings, reference numeral 1 designates a handle made up of a parallel rod 11 and handle grips 12 and 12 at both ends of the parallel rod. The middle of the parallel rod 11 is secured to an upper end portion of a handle post 2 of an ergometer indicated by an arrow A in such a manner that the handle can be turned if necessary. As is apparent from FIGS. 1 or 4, each handle grip 12 consists of a gripping rod 12a and an upright rod 12b, being L-shaped as viewed from front. The upper ends of the upright rods 12b and 12b merge with both ends of the parallel rod 11 in such a manner that the parallel rod 11 forms right angles with the upright rods 12b. The middle of the parallel rod 11 is hexagonal in section so that it can be fixedly secured to a holder 3. The holder 3 is fixedly secured to the upper end of the handle post 2.

More specifically, as shown in FIGS. 2 through 5, a rectangular-box-shaped frame is laid down and secured to the upper end of the handle post 2. Inserting grooves 31 are cut in the central portions of side walls of the frame so that the parallel rod 11 is inserted into the grooves 31 and secured there. The inserting grooves 31 are so cut that the parallel rod 11 can be inserted thereinto from front. The bottoms of the inserting grooves 31 are locking parts 32 which are so shaped as to receive the hexagonal part of the parallel rod 11. In practice, in order to turn the parallel rod 11 in multi-steps, it is desirable that the configuration of the locking part 32 is such that the locking part has locking angles the number of which is an integer times the number of locking angles given to the parallel rod 11. In this embodiment, six locking angles are given to the parallel rod 11 while the locking part 32 has twelve locking angles. Further, the locking part 32 may be so designed as to have twenty-four locking angles. The inside part of the parallel rod 11, i.e., the left-handed part of the parallel rod 11 in FIG. 5, is engaged with locking parts 32. Therefore, in the configuration of the locking part 32, a half of the twelve or twenty-four locking angles are utilized in practice.

Reference numeral 4 designates a handle holding board which is formed by combining a sliding plate 42 with the ends of a bent plate 41 which is U-shaped in section, so that the parallel rod 11 can be inserted into the handle holding board 4. The handle holding board 4 is slidably mounted inside the holder 3. Reference numeral 5 designates a knob for sliding the handle holding board 4. The knob 5 has a threaded rod 51 which is threadably engaged with the sliding plate 42. Reference numeral 52 designates a leaf spring for pulling the knob 5 towards the operator at all times. The leaf spring 52 is elastically mounted on the holder 3 with screws 53 and 53 at both ends. In the drawings, reference numeral 6 designates a saddle of the ergometer.

The handle thus constructed according to the present invention has the following specific features:

(1) The handle of the present invention is made up of the parallel rod 11 and two L-shaped handle grips 12 which are integrally connected to both ends of the parallel rod 11 in such a manner that each handle grip forms right angles with the longitudinal direction of the parallel rod. Accordingly, when the handle is in use, the handle grips are perpendicular to the widthwide direction of the shoulders of the user, so that he can put forth his strength more, and the fatigue of his wrists can be minimized.

(2) The handle 1 is mounted on the holder 3 in such a manner that the parallel rod 11 can be turned when required. Therefore, by turning the handle as indicated by the dotted lines in FIG. 1, the distance between the saddle and the handle grips can be readily set to a value which is most suitable for the user's physical constitution.

Figure 5A:
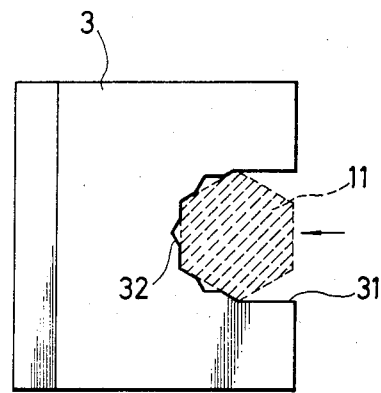
FIGS. 5A and 5B are side views showing the rotation of the handle with respect to the inserting grooves of the holder.
Figure 5B:
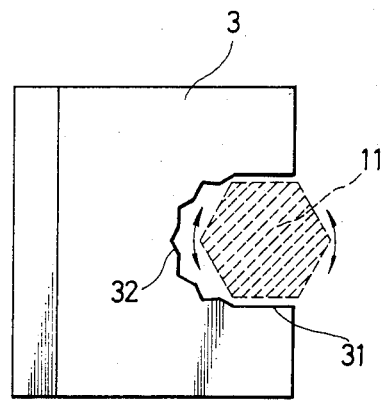

(3) The handle grips 12 can be readily turned. It can be readily operated by a person who is not familiar with mechanical operations. If the handle holding board 4 is released by loosening the knob 5, then the angular part of the parallel rod 11 is disengaged from the inserting grooves 31 of the holder 3. Under this condition, the distance between the saddle 6 and the handle grips 12 is adjusted and the knob 5 is tightened. As a result, the angular part of the parallel rod 11 is firmly locked in the inserting grooves 31 of the holder. The parallel rod 11 turned have been rigidly secured to the holder 3. Therefore, even when a strong force is applied to the handle 1 by pedalling, no dangerous condition such as for instance the abrupt movement of the handle will never take place. FIGS. 5a and 5b are side views showing the rotation of handle with respect to the inserting grooves of the holder. Specifically, FIG. 5a shows that the handle is fixed in the inserting grooves of the holder, and FIG. 5b shows that the handle is being slid in the inserting grooves of the holder.

What is claimed is:

1. A handle mounted on top of a handle post of an ergometer, comprising:
   a rod having a middle portion polygonal in cross section;
   handgrip means at the distal ends of said rod;
   a first holding means for adjustably positioning said rod relative to the handle post, said first holding means having spaced sidewalls with parallel inserting grooves therein, each said groove having locking portions at the innermost end configured to receive and lock said middle portion of said parallel rod against rotation in said groove;
   fixing means for rigidly securing said first holding means to said handle post;
   a second holding means movably mounted between said sidewalls of said first holding means for receiving and supporting said polygonal middle portion of said rod;
   means for threadably engaging said second holding means to move said second holding means relative to said first holding means and to move said rod between a locked and unlocked position in said grooves; and
   spring means attached to said first holding means and contacting said threadable means for tensioning said threadable means within said first holding means to hold said rod in one of said locked positions.

2. The handle as in claim 1, wherein said handgrip means includes two L-shaped members, each comprising a gripping rod and an upright rod, said members being perpendicular to the longitudinal direction of said rod.

3. The handle as in claim 1, wherein said locking parts of said inserting grooves are configured to form a finite number of locking angles equivalent to an integer times the number of sides of said polygonal portion of said rod.

4. The handle as in claim 1, wherein said polygonal portion is a hexagon.

* * * * *